Jan. 4, 1966   F. C. BRESK ETAL   3,226,974
SHOCK TESTING APPARATUS
Filed July 13, 1962   5 Sheets-Sheet 1

INVENTOR.
FRANK C. BRESK
ROBERT P. GRAY
MELBOURNE A. LIPP
BY *Leon F. Herbert*
ATTORNEY Jan. 4, 1966  F. C. BRESK ETAL  3,226,974
SHOCK TESTING APPARATUS
Filed July 13, 1962  5 Sheets-Sheet 2

INVENTOR.
FRANK C. BRESK
ROBERT P. GRAY
MELBOURNE A. LIPP
BY Leon F. Herbert
ATTORNEY INVENTOR.
FRANK C. BRESK
ROBERT P. GRAY
MELBOURNE A. LIPP
BY Leon E. Herbert
ATTORNEY Jan. 4, 1966 F. C. BRESK ETAL 3,226,974
SHOCK TESTING APPARATUS
Filed July 13, 1962 5 Sheets-Sheet 4

INVENTOR.
FRANK C. BRESK
ROBERT P. GRAY
MELBOURNE A. LIPP
BY Leon F. Herbert
ATTORNEY

INVENTOR.
FRANK C. BRESK
ROBERT P. GRAY
MELBOURNE A. LIPP
BY Leon F. Herbert
ATTORNEY

United States Patent Office 3,226,974
Patented Jan. 4, 1966

3,226,974
SHOCK TESTING APPARATUS
Frank C. Bresk and Robert P. Gray, Carmel Valley, and Melbourne A. Lipp, Pebble Beach, Calif., assignors to Monterey Research Laboratory, Inc., Monterey, Calif., a corporation of California
Filed July 13, 1962, Ser. No. 209,678
24 Claims. (Cl. 73—12)

This invention relates to shock testing of devices which must be designed to withstand various types of impacts in actual use. More specifically the invention relates to test apparatus for producing various types of shock conditions.

In modern fields of advanced technology there are many situations where operating devices are required to withstand severe and varying conditions of mechanical shock. In many cases it is impossible or prohibitively expensive to test such devices in actual operation. Therefore considerable effort has been directed toward the design of testing machines which will subject devices to controlled shock conditions in the test laboratory in order to perfect and prove the ability of the devices to perform successfully in actual operation.

The development of a versatile shock testing machine is complicated by the fact that the required test conditions cover a wide range of type and magnitude of shock parameters. Some of these variable parameters are duration of the shock, magnitude of acceleration force, and shape of the shock pulse as represented by an acceleration versus time diagram. Some of the desired types of pulse shapes include sine wave, square wave and saw-tooth pulses.

A relatively successful basic approach to shock testing apparatus which has been in use for many years comprises generally a drop table guided for free fall and impact against a fixed massive base. The test specimen is mounted on the drop table and means are provided for elevating the table above the base and then quickly releasing the table for the free fall. In order to approximate the desired shock conditions of duration, magnitude and pulse shape, the prior art apparatus has employed a variety of shock programming means interposed between the drop table and base. Such prior art programming means includes elastic decelerators such as conventional metal or rubber springs, and plastic decelerators such as lead pads or sand piles, very often peculiarly shaped to provide specific pulse shapes.

Although the prior art approaches have greatly advanced the field of shock testing, they have several limitations. For example, decelerators or programmers such as conventional metal or rubber springs are incapable of producing square wave and saw-tooth pulses and often only approximate the production of perfect sine wave pulses. The plastic decelerators can be designed to give a square wave pulse but are destroyed by the test and must be replaced for each new test drop. This lack of reusability results in costly and time consuming testing, and presents an inherent difficulty in achieving exact duplication of tests since a new plastic programmer is required for each test. Another limitation of the plastic type programmer is that it simply decelerates the drop table and provides no rebound to the table. Thus the total shock impulse (defined as velocity change) is inherently limited. Programming of saw-tooth pulses has also been difficult, and attempted prior art solutions have involved either plastic programmers as previously described, or other complicated and costly apparatus.

In addition to the cost and imperfection of prior art programming means, the widely different programmers required for the various pulse shapes has often resulted in the need for a specially designed test machine of the type described for use with each of the different types of programming means. This situation has compelled testing laboratories to install a plurality of testing machines in order to perform the required variety of tests.

Accordingly, it is an object of this invention to provide shock testing apparatus which will provide the desired pulse shapes with improved accuracy.

A further object of the invention is to provide improved shock testing apparatus which will provide precisely reproducible tests.

An additional object of the invention is to provide improved shock testing apparatus which will provide double the shock impulse (velocity change) possible with plastic type programmers, in the case of certain shock pulse wave forms.

Another object of the invention is to provide improved shock testing apparatus which will permit simple and rapid change from one type of test to another.

A further object of the invention is to provide improved shock testing apparatus which will perform a wide variety of different tests at reduced cost of acquisition, installation and operation.

An additional object of the invention is to provide improved shock absorbing or programming devices.

By way of brief description, these and other objects of the invention are achieved by means of testing apparatus which includes shock programming means of a type which employs a fluid filled container of variable volume. The container is preferably in the form of a cylinder having a plunger movable into one end through a sliding seal. The fluid type programmer is located between the drop table and base so that as the table falls toward the base, the cylinder and piston are compressed between them. This results of course in forcing the plunger into the cylinder to compress the fluid therein. The fluid first decelerates the falling table, absorbing the energy in the table, and then returns this energy to accelerate the table upwardly. A variety of pulse shapes can be obtained by simply interchanging a few differently designed fluid programmers, the testing apparatus being constructed in a manner which permits the programmers to be quickly and easily interchanged.

Other and further objects and features of advantage will be apparent from the following detailed description which refers to the accompanying drawings in which.

Figure 1:
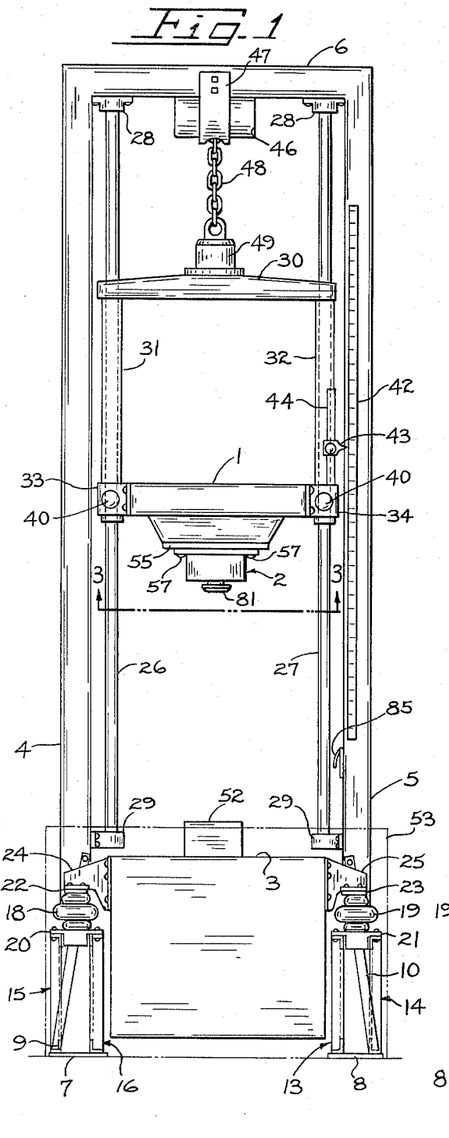
FIGURE 1 is a front elevational view of testing apparatus according to the invention, including the basic machine and one programmer.
Figure 2:
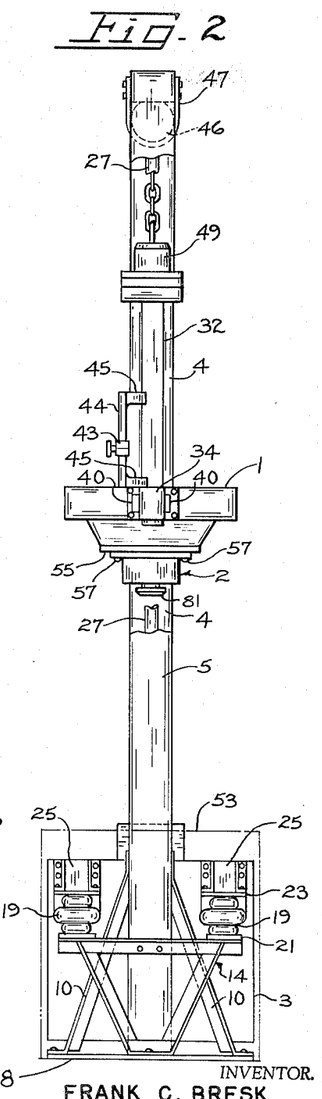
FIGURE 2 is a side elevational view of FIGURE 1, partially cut away for clarity.

Referring to the drawings in more detail, FIGURES 1 and 2 show a testing machine comprising a drop table 1, a fluid type programmer 2, and a seismic base or reaction mass 3. The machine has an inverted U-shaped frame with vertical side posts 4 and 5 and a connecting top piece 6. This frame can be conveniently fabricated from metal strips welded together so that each of the portions 4–6 has a hollow rectangular cross section. Side posts 4 and 5 are welded to base plates 7 and 8, respectively, and this connection is reinforced by two pairs of support straps 9, 9 and 10, 10, respectively, bolted to the side posts and base plates.

A pair of welded angle iron frames 13 and 14 are bolted on the opposite sides of the side post 5 and a similar pair of frames 15, 16 are bolted on the opposite sides of post 4. The base 3 is preferably isolated from the floor on which the machine rests and this is accomplished by means of two pairs of conventional air springs 18 and 19. The springs have bottom mounting plates 20 and 21, respectively, which are bolted on the top of frames 15 and 14, respectively. The springs have top mounting plates 22 and 23, respectively, which are bolted to support ears 24 and 25 attached to the sides of base 3.

The drop table 1 runs on a pair of guide posts 26 and 27 which are circular in cross section. The tops of the guide posts are attached to top piece 6 by means of bracket 28 and to side posts 4 and 5 by means of brackets 29. The structure for elevating and stopping the drop table includes a lifting yoke 30 attached to a pair of guide sleeves 31 and 32. The bottom ends of sleeves 31 and 32 carry guide journals 33 and 34, respectively, which are bolted to and support the drop table 1. Each of the guide journals includes a pair of conventional air brakes 40 which operate to force brake shoes against guide posts 28 and 29 in well known manner. Solenoid valve controlled air lines (not shown) serve to energize the brakes in a manner which will be hereinafter explained in connection with operation of the complete testing machine. A drop height indicator scale 42 is marked on the side post 5, and an adjustable pointer 43 is mounted on a track 44 which is welded to guide sleeve 32 by support arms 45. An electric motor hoist 46 is attached to the frame top piece 6 by means of a strap 47. The hoist 46 is connected by a chain 48 to a lifting and release magnet 49 which is operated by a conventional switch (not shown) in a manner to be hereinafter described.

In order that the motions of the reaction mass 3 will be negligible during the shock pulse, mass 3 is made substantially heavier than the weight of the falling package. The falling package includes the table 1, structure 2, 30–34, 40, 43 and 44, and the test specimen, plus any test weights which are added to the table. A suitable difference in mass, for most purposes is achieved if the reaction mass weighs at least about eight times the falling package. Accordingly the reaction mass 3 is preferably made as a heavy forged steel billet and the drop table 1 is made of magnesium. The reaction mass 3 is preferably shaped to include an upwardly extending impact plate 52 so that an impact surface of the reaction mass will project above a sheet metal enclosure around the base of the machine as indicated by the dot-dash outline 53.

Figure 3:
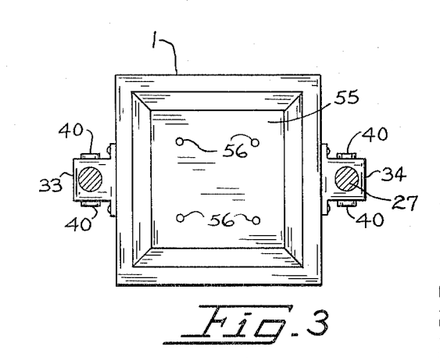
FIGURE 3 is a bottom view of the drop table taken on line 3—3 of FIGURE 1, with the programmer removed.
Figure 5:
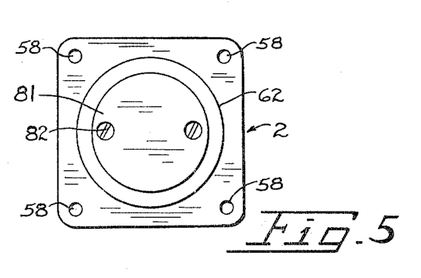
FIGURE 5 is a bottom view of FIGURE 4 on reduced scale.

The bottom of drop table 1 and the fluid type programmer 2 are specifically designed so that the programmer can be quickly and easily removed and replaced by a programmer having a different internal construction. Various types of internal construction will be later described in detail. As shown in FIGURES 1, 2 and 3, the bottom of drop table 1 is provided with a flat mounting surface 55 provided with drilled and threaded holes 56 which receive the four mounting bolts 57 to secure programmer 2 to the drop table. As shown in FIGURES 1, 2 and 5, the programmer 2 is provided with a flat end surface having four mounting holes 58 which receive the bolts 57 and are positioned to match the holes 56 in the drop table.

Figure 4:
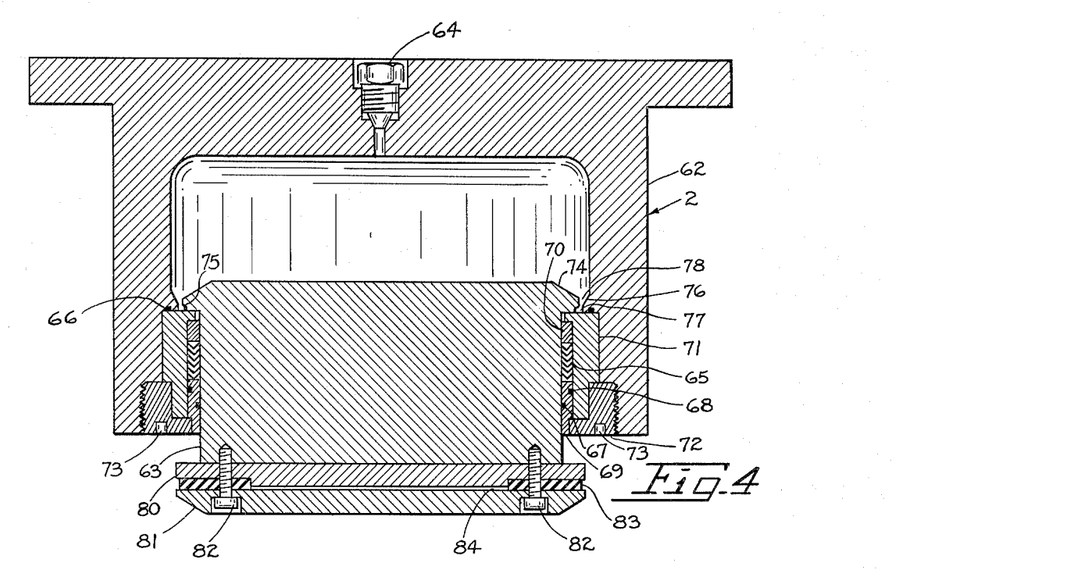
FIGURE 4 is a cross section view showing the programmer of FIGURE 1 on enlarged scale, which programmer provides half sine wave pulses.

As shown in FIGURE 4, the fluid type programmer 2 comprises a cylinder 62 and a plunger 63. The cylinder 62 carries a threaded filler-and-bleed plug 64 so that after the cylinder and plunger are assembled the cylinder can be filled with liquid, preferably at atmospheric pressure. All liquids are compressible to some degree, but one of the more compressible types such as conventional silicon liquid is preferred. The plunger is axially movable in the cylinder through a sealing structure including Chevron type packing 65 and sealing rings 66, 67 and 68. Cooperating metal rings 69, 70, 71 and 72 serve to hold the packing in place. Ring 72 is threaded in the cylinder and is provided with holes 73 for tightening with a spanner wrench.

It will be noted that the inner end of the plunger has an outwardly extending stop rim 74 which abuts the stop ring 71 when the plunger is fully extended. It will also be noted that the flange is undercut at 75 and that the cylinder bore is tapered inwardly at 76 so that it almost touches rim 74 in the extended position. This arrangement provides a well or entrapment space 77 and a restricted annular passage therefrom 78. The reason for this construction is that in shock testing, a clean well defined shock pulse is required without extraneous impulse or vibration before, during, or after the desired pulse. After the drop table 1 is released and plunger 63 strikes impact plate 52, the plunger is first forced into cylinder 62 which compresses the fluid therein. Then the compressed fluid reacts against plunger 63 to force the plunger out of the cylinder. The first part of this outward movement causes the table to rebound upwardly and the continued outward motion of plunger 63 would introduce undesirable extraneous pulses if its outward motion were stopped sharply. According to the invention the outward motion of the plunger is stopped slowly or cushioned because the fluid trapped underneath rim 74 and in entrapment space 77 can only escape through the restricted passage 78. It will be understood that the cushioning effect is even further increased by the use of the tapered wall 76 which causes the size of restricting passage 78 to start out relatively large and diminish as the plunger rim moves out toward the fully extended position.

Another feature of the fluid type programmer 2 relates to the construction of the outer end of the plunger. The plunger carries an impact structure comprising two metal disks 80 and 81 secured to the plunger by screws 82. The disks are spaced apart by a ring 83 of elastomeric deadening material such as synthetic rubber. The spring rate of ring 83, although much less than the spring rate of the metal disks 80 and 81 is substantially higher than the spring rate of the fluid filled cylinder-plunger unit. Thus the presence of ring 83 has a negligible effect on the desired basic pulse characteristic. The thickness of ring 83 is such that a space 84 is left between the disks 80 and 81. The screws 82 are not threaded in the impact disk 81 so that upon impact, disk 81 is free to move upwardly relative to disk 80 and thus transmit the forces through ring 83. The screws 82 are countersunk in disk 81 so that the screws will not strike the impact plate 52. This previously described impact structure deadens the initial impact and prevents the introduction of extraneous high frequency vibration which would be present if the high resonant frequency metal plunger hit the high resonant frequency impact plate without cushioning.

An operating cycle of the machine will now be described. The specimen to be tested is bolted to the top of the drop table 1 under yoke 30. As is conventional in the art the top surface of the table can be provided with an array of threaded holes (not shown) for the purpose of attaching variously shaped test specimens. Weights may also be added to the top of table 1 to obtain a specific drop package weight as will be hereinafter explained. Loading of the table can take place in the lowered position with programmer 2 resting on the impact plate 52, or the table can be loaded at some elevated location with the brakes 40 in the "on" position. In the latter event it is sometimes conventional to employ a positive latching arrangement (not shown) to prevent the table from falling in the event of failure of electrical or air pressure supply to the brake system. In either case, after the table is loaded the magnet 49 is energized to grip the yoke 30, and the brakes and/or latch mechanism is released. The electric hoist 46 is then energized to raise the drop table to a height, as indicated by pointer 43, which has been precalibrated to result in a shock pulse of the desired maximum acceleration. It should be noted that the term "acceleration" is here and hereinafter used to define change in table velocity upon and after impact, including both the initial deceleration in the downward movement of the table and the following upward acceleration of the table when it stops moving down and is accelerated upwardly upon rebound.

The maximum acceleration of the drop package is a function of the weight of the drop package, the drop height and the spring rate. In view of this plurality of variables it has become recommended practice to maintain the weight of the drop package constant and simply prepare a drop height chart for a programmer of given spring rate, which chart specifices the required drop height for a desired peak acceleration. This is the reason why compensating weights are used. For example, if the drop height distance for a maximum acceleration of 10 g's is calibrated for the weight of the table structure plus 700 pounds and the test specimen weighs 100 pounds, then 600 pounds in weights should be added.

After the table with test specimen and any required weights is elevated to the desired drop height, the magnet 49 is deenergized and the table falls freely under the force of gravity. At the bottom of the fall the impact disk 81 on the programmer 2 strikes the impact plate 52 on the reaction mass 3. The force of the falling drop package drives the plunger 63 up into the cylinder 62 thus compressing the liquid in the cylinder and absorbing the energy of the falling package. At the end of the downward travel of the table, the energy now stored in the compressed liquid is returned to the system to cause the table to rebound upwardly. In order to prevent the table from falling again from its rebound height, a conventional switch 85 is mounted on the side of post 5 so that downward movement of the table will cause the guide journal 34 to depress the switch. Switch 85 controls conventional electrical delay mechanism timed so that the solenoid valve which controls brakes 40 will be actuated to port compressed air to brakes 40 in time for the brakes to be applied near the top of the rebound. The test can then be repeated simply by attaching the magnet, releasing the brakes and energizing the hoist to raise the table to same height set for the first test, or a new test can be run from some other height. The control circuitry for the hoist, magnet and brake system is conventional in shock testing machines and is therefore not shown in the drawings. It is also standard practice to attach conventional acceleration measuring instruments to the drop table and to read the measurements of these instruments on an oscilloscope during impact and rebound. The trace on the oscilloscope is photographed to give an acceleration versus time diagram, for example as shown in FIGURE 7.

Figure 6:
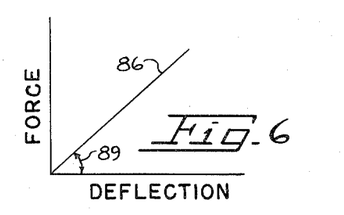
FIGURE 6 is a force versus deflection diagram or spring rate for the programmer of FIGURE 4.

The fluid programmer 2 is designed to provide a test involving a half sine wave pulse shape. In other words the acceleration versus time diagram is required to have a half sine wave shape. This is a standard test commonly specified in the field of shock testing. However, previous machines of the drop table type have experienced difficulty in achieving a precise half sine wave pulse. The fluid type programmer 2 provides a substantially perfect half sine wave pulse as shown in FIGURE 7. As is well known by those skilled in the art, the shape of the acceleration versus time diagram is governed by the spring rate of the programmer positioned between the drop table and the reaction mass. More specifically, a linear spring rate is required in order to give a sine wave acceleration versus time diagram. Liquid, particularly silicon oil type liquid has a substantially linear pressure increase versus plunger displacement or deflection. Therefore the spring rate of the liquid programmer 2 is a straight line diagram as shown by line 86 in FIGURE 6 which provides the precise sine wave acceleration curve in FIGURE 7. Conventional elastic programmers such as metal or rubber springs normally have force versus deflection diagrams which are not precisely straight lines. Programmer 2 can provide tests at various levels of maximum acceleration by simply varying the drop height. As shown in FIGURE 7, a high drop height gives a high peak acceleration curve 87 and a low drop height gives a low peak acceleration curve 88.

Figure 7:
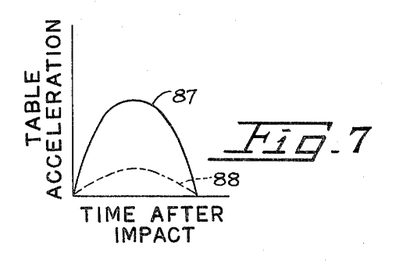
FIGURE 7 is an acceleration versus time of pulse diagram for the programmer of FIGURE 4.

Another test parameter often varied in standard test specifications is the duration of the pulse, that is the distance along the time axis in FIGURE 7 between start and end of the acceleration curve. As is well known by those skilled in the art the duration is a function of the spring rate and drop weight but is independent of drop height. Increasing the drop height with a given programmer and drop weight simply causes the system to operate to a higher point on the force-deflection curve of FIGURE 6, resulting in greater maximum acceleration but the same inherently fixed duration. The duration is preferably changed by using a programmer having a different angle 89 for the straight force-deflection line 86 in FIGURE 6. More specifically, a programmer having a smaller angle 89 for the spring rate line gives a longer duration pulse and a larger angle gives a shorter duration pulse. The fluid type programmer 2 can be provided in a number of slightly modified designs to give the desired variety in pulse duration. The only difference required is the relation between liquid volume and the cross section area of the plunger which moves into the cylinder to reduce the liquid volume. This relationship will be hereinafter referred to as the volume over plunger displacement ratio. More specifically, the higher the volume over plunger displacement ratio, the further the plunger will have to be displaced to achieve a given fluid pressure or spring force, and the lower will be the angle 89 for the spring rate line in FIGURE 6. This results in a longer pulse duration as previously explained. Conversely, decreasing the volume over plunger displacement ratio results in decreased pulse duration.

As previously described, it is customary shock testing procedure to calibrate the machine so that for a given weight of drop package, specified drop heights will give specified peak accelerations. In some cases it would be a great advantage to be able to make half sine tests of given pulse duration on test specimen of different weights without having to add and remove ballast weights to maintain a given drop package weight in each case. In other words it would be desirable to be able to make half sine tests of given duration in a convenient manner which did not require a specific drop package weight. In addition, where constant drop weight is maintained, it would be desirable if it were possible to make half sine tests of different duration without having to use several programmers of differing spring rates.

Figure 8:
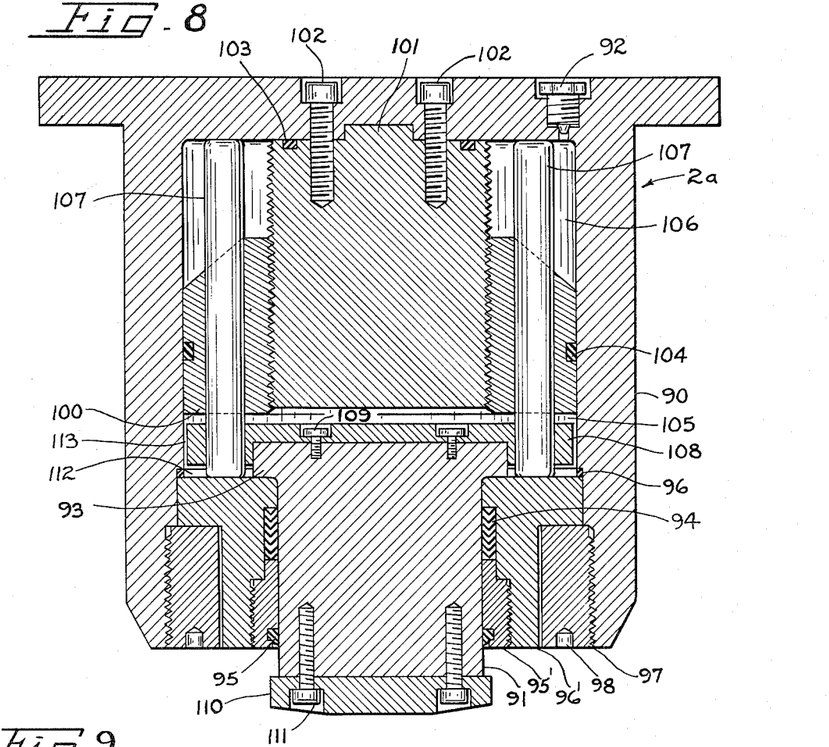
FIGURE 8 is a cross section view similar to FIGURE 4 showing an adjustable half sine wave programmer.

FIGURE 8 shows a modified fluid type programmer 2a which is adjustable to provide the features mentioned in the preceding paragraph. More specifically the programmer 2a is adjustable to provide tests having constant pulse duration with drop packages of varying weight, and adjustable to provide tests having variable pulse duration with drop packages of uniform weight. The adjustment which makes the desired changes possible is an adjustment which results in a change in the volume over plunger displacement ratio.

The fluid type programmer 2a comprises a cylinder 90, and a plunger 91. The cylinder 90 carries a threaded filler-and-bleed plug 92 so that after the cylinder and plunger are assembled the cylinder can be filled with liquid, preferably a silicon liquid at atmospheric pressure. The plunger 91 has an outwardly extending stop flange 93. The plunger is axially movable in the cylinder through a sealing structure comprising Chevron type packing 94 and a sealing 96. Ring 95 serves primarily as a dirt remover or wiper. Cooperating metal rings 95', 96' and 97 serve to hold the packing in place. Ring 97 is provided with wells 98 for tightening with a spanner wrench.

In order to provide the feature of adjustability, the cylinder is provided with a movable wall member 100. Wall 100 is an annular member threaded on a fixed center wall 101 which is mounted in the cylinder by screws 102 and sealed by sealing ring 103. The periphery of movable wall 100 is sealed against the cylinder 90 by sealing ring 104 so that two separate liquid chambers 105 and 106 are formed on opposite sides of the movable wall. Chamber 105 is the effective chamber, the volume of which determines the volume over plunger displacement ratio. Chamber 106 is simply a storage chamber as will be hereinafter explained. In order to provide for adjustment of the axial position of wall 100, the wall is drilled to receive two or more guide pins 107. The pins have a close but sliding fit in wall 100, and the ends of the pins slidingly abut ring 96' and the end wall of cylinder 90. If pins 107 are caused to revolve around the axis of the cylinder, they will force wall 100 to rotate and thus be driven axially by its threaded engagement with the fixed wall 101.

The inner end of plunger 91 is provided with a plate 108 which is also bored to receive pins 107 so that the pins can be caused to revolve about the axis of the cylinder simply by rotating the plunger. The plate 108 is attached to the plunger by screws 109 or could of course be made integral with the plunger. The outer end of the plunger has an impact disk 110 attached to it by screws 111, and disk 110 is hexagonal (FIGURE 9) so that it can be easily gripped and turned by an end wrench.

It will be noted that the plunger plate 108 does not quite engage ring 96' in the fully extended position and that the rim of plate 108 does not quite engage the inner wall of cylinder 90. This construction provides an entrapment space 112 and a restricted annular passage 113 for the reasons explained in connection with space 77 and passage 78 in FIGURE 4. Although FIGURE 8 does not show cushioning material between disk 110 and the plunger such as material 83 in FIGURE 4, the type of construction shown in FIGURE 4 is recommended for tests in which it is required to remove incidental high frequency vibrations.

Figure 10:
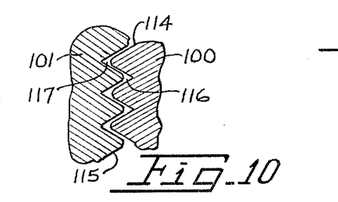
FIGURE 10 is an enlarged sectional view of a portion of the screw threads in FIGURE 8.

As previously explained the angle of the force-deflection line for a liquid spring is determined by the volume over plunger displacement ratio. In FIGURE 8 the plunger displacement is of course unchangeable, but the volume 105 is changeable. However, in order for volume 105 to be an effective liquid spring volume it must be a substantially fluid tight volume. Yet if chambers 105 and 106 were completely fluid tight it would not be possible to move wall 100 axially in the cylinder. Thus there must be a leakage passage between chambers 105 and 106 such that the liquid can move between the chambers when the wall 100 is slowly moved axially by rotating plunger 91. At the same time the leakage passage must appear substantially as a fluid tight seal to the extremely high velocity flow which would be required to appreciably change the volume of fluid in chamber 105 during the short duration of a test pulse. These two requirements are met by a leakage passage which is very small or restricted compared to the volumes of chambers 105 and 106. In addition the operation is enhanced when the restricted leakage passage is of a tortuous or labyrinth type shape as contrasted to a simple straight passage. A very effective restricted passage is provided by simply employing special thread teeth 114 and 115 on walls 100 and 101. The points of these teeth have simply been flattened so that small spiral leakage passages 116 and 117 are provided along the root groove of each of the threads. Obviously, only one set of teeth could be flattened instead of both.

Figure 11:
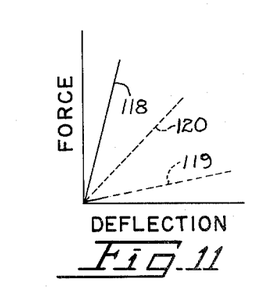
FIGURES 11 and 12 are the spring rate and pulse diagrams, respectively for the programmer of FIGURE 8.

The programmer 2a can be adjusted by axial movement of wall 100 to have a range of spring rate lines as shown in FIGURE 11. The spring rate line 118 is a qualitative representation of the spring rate line corresponding to the low volume size of chamber 105 as shown in FIGURE 8. The spring rate line 119 is a representation of the spring rate line corresponding to a large volume size of chamber 105 such as would obtain when wall 100 is moved upwardly in FIGURE 8 until it engages the end of cylinder 90. The line 120 is one of the many possible intermediate lines.

Figure 9:
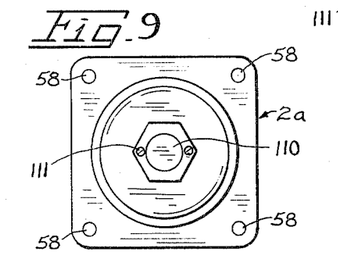
FIGURE 9 is a bottom view of FIGURE 8 on reduced scale.

As shown in FIGURE 9, the programmer 2a is provided with a flat end surface having attachment holes 58 which are identical in size and position with the attachment holes 58 for the programmer 2. Thus, if it is desired to conduct tests with programmer 2a it is simply necessary to remove the bolts 57 in FIGURES 1 and 2, replace programmer 2 with programmer 2a, and replace bolts 57.

The shock testing machine is operated with programmer 2a in the same manner described for use with programmer 2, except that it is not necessary to use ballast weights in order to obtain constant pulse duration for varying weight specimen and it is not necessary to interchange programmers to obtain various pulse durations with a constant drop weight. As will be apparent to those skilled in the art the programmer 2a can be calibrated so that it will provide a specific pulse duration as shown by curve 124 (FIGURE 12) with different specimen weights and therefore different drop package weights. Thus, with a heavy weight specimen the pulse duration shown by curve 124 can be obtained with a low volume over plunger displacement ratio such as is obtained with wall 100 in the position shown in FIGURE 8. The same pulse duration as shown by curve 124 can be obtained for a lighter test specimen simply by moving wall 100 upwardly to increase the volume of chamber 105.

One convenient way to calibrate and adjust programmer 2a is to start with wall 100 bottomed out against the end wall of cylinder 90 and simply count the turns corresponding to desired increments of test specimen weight. Of course a drop height calibration is also made, as in the case of programmer 2, so that for a specified peak acceleration, the test operator can refer to a chart giving the required drop height. Thus, for a constant pulse duration test program involving test specimens of different weights the operator simply rotates the plunger 91 the required number of turns for the particular specimen weight, instead of adding or removing ballast weights. If the test program also involves different peak acceleration requirements, the operator simply varies the drop height as specified on the drop height calibration chart.

Programmer 2a also makes it possible to conduct tests at differing pulse durations without interchanging programmers.

It is possible to calibrate programmer 2a to take into account both change in weight and change in pulse duration. Then the programmer 2a is calibrated so that for each required drop package weight the number of turns of plunger 91 are counted to correspond to the desired different pulse durations. Thus for a given drop package weight, programmer 2a will give the short pulse curve 124 with wall 100 positioned toward the plunger as in FIGURE 8, and a longer pulse curve 125 can be obtained simply by moving wall 100 to a position nearer the closed end of cylinder 90.

Figure 12:
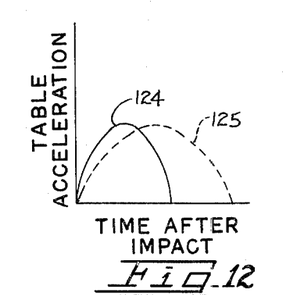
Figure 13:
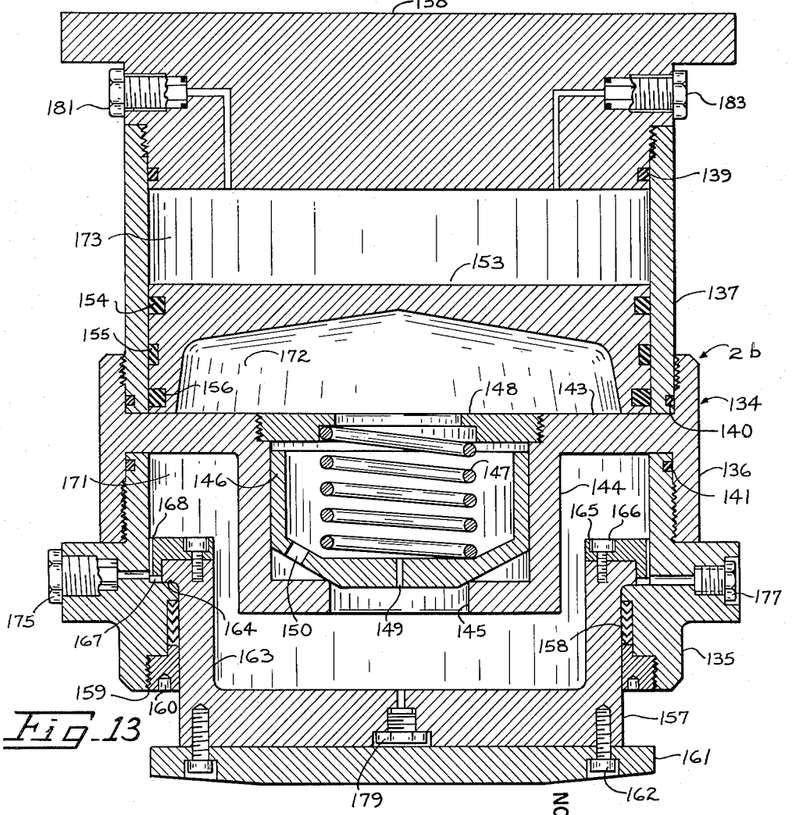
FIGURE 13 is a cross section view similar to FIGURES 4 and 8 but showing a saw-tooth programmer.
Figure 14:
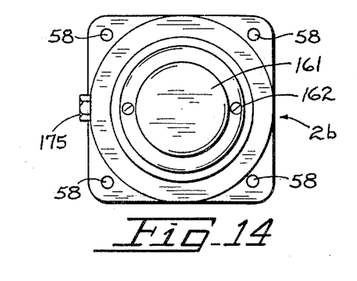
FIGURE 14 is a bottom view of FIGURE 13 on reduced scale.
Figure 15:
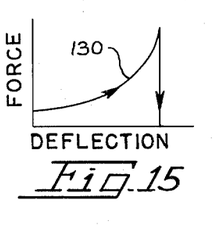
FIGURES 15 and 16 are the spring rate and pulse diagrams, respectively, for the programmer of FIGURE 13.
Figure 16:
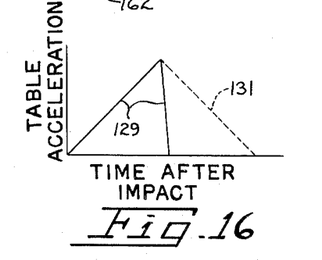

In many cases it is desirable to obtain a shock pulse having a saw-tooth shape, as distinguished from the sine wave shapes shown in FIGURES 7 and 12. FIGURE 13 shows a fluid-type programmer 2b which will provide a saw-tooth pulse as shown by the solid line 129 in FIGURE 16. As is well known to those skilled in the art, the programmer must provide an increasing spring rate as shown by line 130 in FIGURE 15 in order to give the straight line pulse shape 129 in FIGURE 16. This can be accomplished by a fluid programmer which is filled with gas instead of liquid and in which the volume over plunger displacement ratio is not too large, as will be further explained in connection with FIGURE 17. However, a simple gas filled programmer of this type would give a full triangular pulse instead of the saw-tooth pulse 129. The reason of course is that to obtain a saw-tooth pulse, the programmer spring return force must increase with deflection to a maximum and then the return force must drop abruptly to zero. Thus as indicated by the arrowheads in FIGURE 15, the programmer return force must first increase as the plunger is forced inward and then decreased abruptly to zero. Further, the abrupt decrease in return force should occur at the instant the drop table has reached its maximum downward travel and has been slowed to zero velocity; that is, at the point of maximum acceleration. If programmer 2b were a simple gas filled spring, the vertical portion of line 130 would not be present and the programmer would simply rebound back along the curved portion of line 130. In this case the shock pulse diagram would not have the nearly vertical portion of line 129 and instead the rebound portion of the pulse would follow the dotted line portion 131 to provide a full triangular pulse instead of the saw-tooth pulse shown by the complete solid line 129. Programmer 2b provides the force-deflection diagram of FIGURE 15 by means of a multi-chamber device having separate chambers for gas and liquid and a one-way valve for checking the rebound stroke, all as will now be described in detail.

As shown in FIGURE 13 the programmer 2b comprises a cylinder 134 constructed of threadedly engaged side wall sections 135, 136, and 137, and an end wall 138. The various sections are provided with conventional sealing rings 139, 140 and 141 to form a fluid tight construction. The wall section 136 extends inwardly to provide a partition wall 143 having a valve receiving cup 144. The bottom of cup 144 is apertured at 145. A valve 146 is slideably received in cup 144 and is biased by a spring 147 to be normally seated against the rim of aperture 145 and thus keep the aperture closed. A ring 148 is threaded in wall 143 to hold the spring in place. Valve 146 is provided with a restricted leakage passage 149 and a free flow passage 150 of relatively large cross section. An axially movable wall 153 is slideably received in the cylinder section 137 and is provided with conventional sealing rings 154, 155 and 156.

A plunger 157 is mounted for axial movement in the bottom of the cylinder section 135. The plunger movement is sealed by conventional Chevron packing 158 held in place by a ring 159 having wells 160 for cooperation with a spanner wrench. The outer end of the plunger is provided with an impact disk 161 held in place by screws 162. Here again the cushioned construction of FIGURE 4 is recommended in many cases. The inner end of the plunger is recessed at 163 to fit around cup 144 and thus reduce the overall length of programmer 2b. Plunger 157 also has an outwardly extending stop rim 164 and an end ring 165 held in place by screws 166. Ring 165 is designed to provide an entrapment space 167 and has one or more restricted escape grooves 168. As thus described it will be seen that programmer 2b is provided with three distinct fluid chambers 171, 172 and 173. Chambers 171 and 172 are served by a conventional oil charging valve 175, a pressure bleed plug 177 and an oil bleed plug 179. Chamber 173 is served by a conventional air charging valve 181 and air bleed plug 183.

The spring rate of programmer 2b along the curved portion of line 130 is simply a function of the unloaded volume of chamber 173 and the unloaded pressure of the gas therein. The oil in chambers 171 and 172 simply transmits the impact force from plunger 157 to the movable wall 153 during downward motion of the drop table. Therefore, the desired pulse duration can be achieved by varying the stiffness of the spring formed by gas volume 173; in other words by varying the slope of the curved portion of line 130 in FIGURE 15. More specifically, the stiffness can be increased by decreasing the unloaded volume of chamber 173. The size of plunger 157 is constant and therefore the volume over plunger displacement ratio is changed simply by changing the volume of chamber 173. The peak acceleration is of course a function of the drop height for a given unloaded volume and gas pressure in chamber 173. Since the spring formed by gas volume 173 does not have a straight line spring rate, the unloaded gas pressure in chamber 173 must be varied slightly when the unloaded volume of the chamber is varied, if the force deflection curve 130 is to retain a shape which will give the straight line increasing acceleration, line 129 in FIGURE 16. As will be understood by those skilled in the art, these relations of volume and pressure can be easily calculated and charted.

The conditions of unloaded volume and pressure in chamber 173 necessary for a desired test are obtained in the following manner. The pressure bleed plug 177 is opened slightly to allow slow removal of oil from chambers 171 and 172, which were previously filled with oil. Then gas under pressure (as from a bottle of compressed nitrogen) is introduced into chamber 173 through the gas charging valve 181. The gas pressure in chamber 173 forces movable wall 153 downward until it abuts wall 143, forcing oil through passage 149 and out of open plug 177 to accommodate the movement of wall 153. The gas pressure is increased to the desired value and then the charging connection is removed and the conventional charging valve 181 closes. Next bleed plug 177 is closed and oil under pressure is admitted through the conventional charging valve 175 at a selected pressure which is higher than the gas pressure introduced into the chamber 173 so that wall 153 is now forced upwardly to reduce the volume in chamber 173. Obviously, the relation between the initial gas pressure in chamber 173 and the oil pressure subsequently introduced into chamber 171 will determine the final unloaded volume and gas pressure in chamber 173.

When tests having saw-tooth pulse shapes are specified, programmer 2 or 2a is removed and programmer 2b is attached to the bottom 55 of the drop table. Programmer 2b has a flat end surface provided with mounting holes 58 (FIGURE 18) which match the threaded holes 56 in the bottom of the drop table and receive the mounting bolts 57. The operation of the shock test machine with programmer 2b is similar to that described for programmer 2 with the following exceptions. Switch 85 is disconnected because the drop table does not rebound, and ballast weights need not be used because the volume over displacement ratio can be adjusted to correct for change in package weight, as described for programmer 2a. When the impact plate 161 on programmer 157 strikes the impact plate 52 on the reaction mass, plunger 157 moves into cylinder 135, upsetting the internal pressure balance and therefore causing valve 146 to open. This allows the oil in chamber 171 to flow freely into chamber 172 through the port 150. Thus, the impact force against plate 161 is transmitted against the bottom of wall 153 via the oil in chambers 171 and 172. This impact force causes the wall 153 to move upwardly, compressing the gas in chamber 173 and resulting in the spring rate shown by the curved portion of line 130. At the bottom of the downward motion of the drop table, plunger 157 stops moving into the cylinder 135 so that the valve 146 is no longer forced open by oil pressure. The valve then closes immediately and the compressed gas in chamber 173 is prevented from expanding in normal manner because the oil in chamber 172 is trapped by valve 146 and prevents downward movement of wall 153. The return force of the programmer then drops substantially immediately to zero as shown by the nearly vertical position of line 130, which results in the substantially immediate drop to zero acceleration to give the right leg of the saw-tooth pulse 129 in FIGURE 16. The restricted orifice 149 permits the pressure in chamber 173 to move wall 153 slowly downward until the pressure in chambers 171, 172 and 173 is slowly again equalized and plunger 157 has been removed outwardly, gently raising the drop table. The apparatus is then ready to raise the drop table and make another drop.

Figure 17:
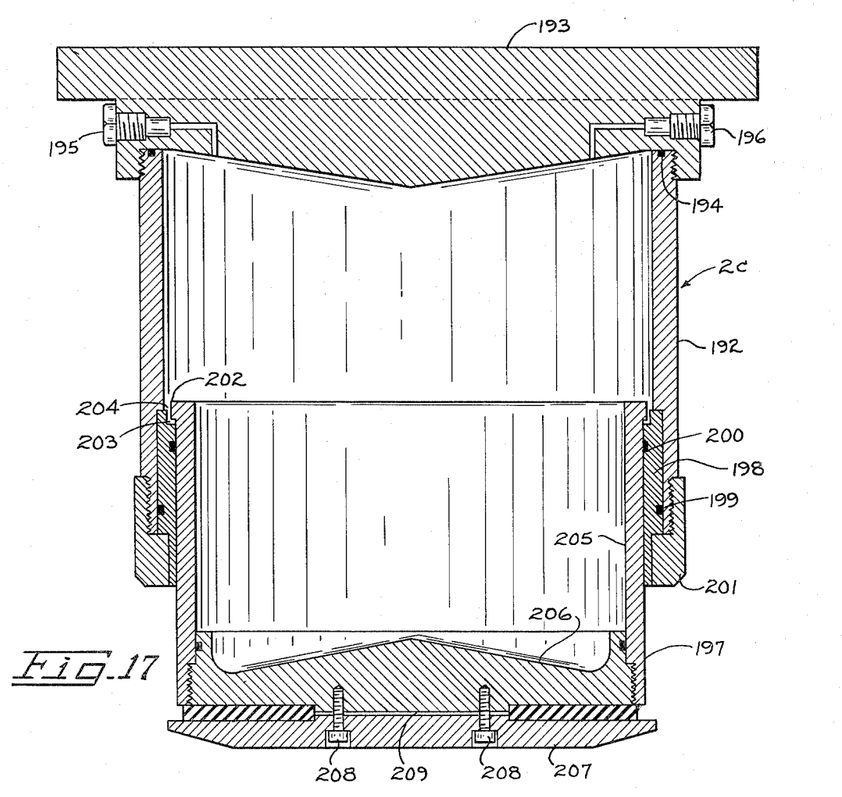
FIGURE 17 is a cross section view similar to FIGURES 4, 8 and 13, but showing a square wave programmer.
Figure 19:
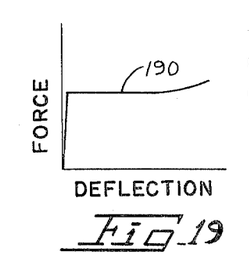
FIGURES 19 and 20 are the spring rate and pulse diagrams, respectively, for the programmer of FIGURE 17.
Figure 20:
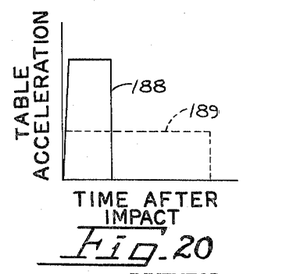

In some cases it is desirable to be able to provide square wave shock pulses such as shown by lines 188 and 189 in FIGURE 19. FIGURE 17 discloses a programmer 2c which accomplishes this result. In order to provide this pulse shape, the programmer must have a spring rate substantially in the form shown by line 190 in FIGURE 19, so that at the moment of impact the spring force is almost immediately at a maximum value and remains substantially at that value throughout the deflection of the plunger. Since the programmer provides a substantially constant spring force the acceleration is substantially constant as shown in FIGURE 20.

It has been found according to the invention that a simple cylinder and plunger type programmer can provide the type of spring rate diagram shown in FIGURE 19 if the volume over plunger displacement ratio is large and the programmer is filled with gas under substantially higher than atmospheric pressure. For example, it has been found convenient and successful to charge the programmer with nitrogen at about 2,000 pounds per square inch.

In more detail programmer 2c comprises a cylinder assembled from a side wall section 192 and a threadedly attached end wall 193 with a conventional sealing ring 194 between them. End wall 193 carries a conventional charging valve 195 and bleed plug 196. A plunger 197 is provided for axial movement in the lower end of side wall 192. The plunger is sealed in the cylinder by means of a sleeve 198 carrying conventional sealing rings 199 and 200. The sleeve is held in place by a threaded lock ring 201. Plunger 197 has a radially extending stop rim 202 which provides an entrapment space 203 and restricted passage 204. In order to provide the greatest fluid volume inside the cylinder, plunger 197 is deeply recessed at 205 and has a threaded end member 206. An impact disk 207 is attached to member 206 by screws 208. As in FIGURE 4, an elastomeric cushioning ring is sandwiched between disk 207 and member 206, and a free space 209 is provided between disk 207 and member 206.

According to the well known formula,

Force = mass × acceleration if the spring force is constant the acceleration will be constant because the mass is constant during any given test drop. Thus if programmer 2c is filled with gas at 2,000 p.s.i. for example, the spring force at the moment of impact will be 2,000 p.s.i. times the area of the circle formed by the outside diameter of plunger wall 197. It is also well known that the pressure of a gas increases in substantially direct proportion to its decrease in volume. Thus of the gas volume in programmer 2c were substantially decreased by deflection of plunger 197, the substantially horizontal line 190 would be a curved line such as line 130 in FIGURE 15. Two factors prevent the objectionable curve; one is that with initially high gas pressure or precharge, the spring force is such that it stops the downward travel of the drop table after a relatively short deflection of plunger 197. The second factor is that the shape of the cylinder and piston are such that the gas volume is made so large that the change in volume during the inward travel of the plunger is small compared to the total volume.

Since the return force of programmer 2c is determined primarily by the precharge pressure rather than by compression of the fluid during deflection, the peak acceleration is substantially unaffected by change in drop height. Tests at different peak acceleration values can be accurately and conveniently made by changing the precharge pressure. For example, line 188 in FIGURE 20 shows a shock pulse at high precharge pressure and line 189 shows a shock pulse at lower precharge pressure, both for a given weight of drop package. Although change in drop height does not change the peak acceleration, change in drop height can be employed to obtain different pulse durations at a given peak acceleration. Obviously, the higher the drop height the longer will be the pulse duration.

Figure 18:
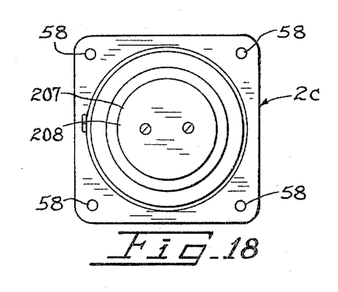
FIGURE 18 is a bottom view of FIGURE 17 on reduced scale.

As shown in FIGURE 18, the programmer 2c is provided with the four mounting holes 58 which match the bores 56 in the bottom of the drop table. If square wave tests are required, the operator simply removes the programmer 2, 2a or 2b and replaces it with programmer 2c, the latter being provided with a flat end surface having mounting holes 58 (FIGURE 18) matching the mounting holes 58 in the other programmers. The square wave tests are then conducted by operating the machine in a manner similar to that described for operation with programmer 2, except that variation in peak acceleration is achieved by charging the programmer with gas at the pressure prescribed for the desired acceleration, and variation in pulse duration for a given peak acceleration is achieved by changing drop height according to a drop height chart prepared for a given weight of drop package.

Although preferred embodiments of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A shock testing machine comprising a movable support for carrying a test specimen, a relatively stationary reaction mass, means for guiding said support for movement toward said reaction mass, and a fluid containing shock programmer between said support and said reaction mass, said programmer comprising a chamber-forming container, a plunger slidingly sealed in an opening in said container, a moveable partition wall in said container and forming one wall of a pressure chamber receiving said plunger, means for moving said wall toward and away from said plunger and for preventing movement of said wall by fluid pressure in said pressure chamber, and means forming a restricted passage connecting the portions of said chamber on opposite sides of said wall, said partition wall forming a complete separation between the chamber portions on opposite sides thereof except for said restricted passage means.

2. A shock testing machine comprising a movable support for carrying a test specimen, a relatively stationary reaction mass, means for guiding said support for movement toward said reaction mass, and a fluid containing shock programmer between said support and said reaction mass, said programmer comprising a chamber-forming container, a plunger slidingly sealed in an opening in said container, a moveable partition wall in said container, a fixed partition wall in said container between said moveable wall and said plunger, a valve across said fixed wall, spring means biasing said valve toward the closed position, said valve being openable in the direction away from said plunger, a constantly open restricted passage connecting the portions of said chamber on opposite sides of said fixed wall, and a relatively unrestricted closeable passage connecting the portions of said chamber on opposite sides of said fixed wall, said relatively unrestricted passage being closed except when said valve is open.

3. A shock testing machine comprising a moveable support for carrying a test specimen, a relatively stationary reaction mass, means for guiding said support for movement toward said reaction mass, said support having a programmer-attachment-surface, a shock programmer comprising a chamber-forming cylinder having a surface at one end thereof abutting said attachment-surface on the moveable support, means releasably attaching said cylinder to said moveable support, and a plunger slidingly sealed in the other end of said cylinder, said cylinder being filled with fluid.

4. A shock testing machine as claimed in claim 3 further comprising a moveable partition wall slidingly sealed in said cylinder adjacent said one end thereof and forming therewith a first sub-chamber, said first sub-chamber being filled with gas, a fixed partition wall in said cylinder between said moveable wall and said plunger and forming second and third sub-chambers with said moveable wall and plunger respectively, said second and third sub-chambers being filled with liquid, a valve controlling communication between said second and third sub-chambers, spring means biasing said valve toward the closed position, said valve being openable by high pressure in said third sub-chamber relative to the pressure in said second sub-chamber, a constantly open restricted passage connecting said second and third sub-chambers, and a relatively unrestricted closeable passage connecting said second and third sub-chambers, said relatively unrestricted passage being closed except when said valve is open.

5. A shock testing machine comprising a movable support for carrying a test specimen, a relatively stationary reaction mass, means for guiding said support for movement toward said reaction mass, and liquid spring programmer means between said support and said reaction mass for providing a half sine shock pulse of acceleration plotted against time, said programmer means comprising a container forming a pressure chamber therein, a plunger slidingly sealed in an opening in said container for movement into said chamber, said chamber being completely filled with compressible liquid, the walls forming said chamber being immovable by the pressure of liquid in the chamber, and the walls forming said chamber being substantially closed to the passage of liquid throughout the entire inward movement of said plunger during the shock pulse.

6. A shock testing machine as claimed in claim 5 further comprising wall means forming a secondary chamber, means for increasing the volume of one of said chambers and decreasing the volume of the other chamber, and restricted passage means permitting slow passage of liquid between said pressure chamber and said secondary chamber when the volumes of the chamber are being changed, said pressure chamber and secondary chamber being completely separated except for said restricted passage means.

7. A shock testing machine as claimed in claim 5 in which one of said walls of the pressure chamber forms a partition between said pressure chamber and another chamber in said container, said partition wall forming a seal between said pressure chamber and said other chamber preventing liquid flow therebetween when said plunger moves into said pressure chamber under dynamic impact from said movable support, said partition wall being adjustable to change the respective volumes of said chambers, and means for permitting liquid flow between said chambers when said partition wall is adjusted to change the volumes of said chambers.

8. A shock testing machine comprising a movable support for carrying a test specimen, a relatively stationary reaction mass, means for guiding said support for movement toward said reaction mass, and programmer means containing separately gas and liquid positioned between said support and said reaction mass and providing a sawtooth shock pulse of acceleration plotted against time, said programmer means comprising a container forming a first chamber filled with said gas and a second chamber filled with said liquid, a plunger slidingly sealed in said liquid chamber, said chambers being separated by a partition wall slidingly sealed in said container for movement to change the respective volumes of said chambers, means for preventing rebound of said plunger, said container having separate passage means for each of said chambers through which fluid can be added and removed, and openable closures for said passages, whereby the respective volumes and pressures in said chambers can be altered to adjust magnitude and duration of the shock pulse.

9. A shock testing machine comprising a movable support for carrying a test specimen, a relatively stationary reaction mass, means for guiding said support for movement toward said reaction mass, and fluid spring programmer means for providing a square wave shock pulse of acceleration plotted against time, said programmer means comprising a cylinder and a plunger slidingly sealed therein, said cylinder and plunger forming a completely sealed unit positioned entirely between said movable support and said reaction mass, said cylinder being charged with gas at a pressure substantially above atmospheric pressure, and the entire surface of the plunger inside the cylinder being in contact with said gas.

10. A shock testing machine comprising a movable support for carrying a test specimen, a relatively stationary reaction mass, means for guiding said support for movement toward said reaction mass, a fluid spring programmer between said support and said reaction mass, and elastomer material positioned to dampen the impact when said programmer is compressed between said support and said reaction mass.

11. A shock programmer comprising a chamber-forming container, a plunger slidingly sealed in said container, a movable partition wall in said container separating said chamber into two portions, and means for adjusting the position of said movable wall in said container to change the individual volume of said two portions without changing the total combined volume of said two portions, said adjusting means comprising a threaded engagement between said movable wall and said container, and means interconnecting said wall and said plunger for rotation in unison, whereby rotation of said plunger rotates said wall to cause movement thereof toward and away from said plunger.

12. A shock programmer comprising a chamber-forming container, a plunger slidingly sealed in said container, a movable partition wall in said container separating said chamber into two portions, and means for adjusting the position of said movable wall in said container to change the individual volume of said two portions without changing the total combined volume of said two portions, sliding sealing means between said moveable wall and the inside of said container, a fixed partition wall in said container between said moveable wall and said plunger, a valve across said fixed wall, spring means biasing said valve toward the closed position, said valve being openable in the direction away from said plunger, a constantly open restricted passage connecting the portions of said chamber on opposite sides of said fixed wall, and a relatively unrestricted closeable passage connecting the portions of said chamber on opposite sides of said fixed wall, said relatively unrestricted passage being closed except when said valve is open.

13. A shock programmer comprising a chamber-forming container, a plunger slidingly sealed in said container, a radially outwardly extending stop rim on the inner end of said plunger, the periphery of said rim being positioned adjacent the inside of said container to form therewith a restricted annular passage when said plunger is in its fully extended position, and said inside of the container being shaped so that the size of said passage is larger after said plunger moves inwardly from said fully extended position.

14. A shock programmer as claimed in claim 13 further comprising an impact disk on the outer end of said plunger, and cushioning material between said disk and said plunger.

15. A shock programmer as claimed in claim 13 in which said container is filled with liquid.

16. A shock programmer as claimed in claim 13 in which said container is filled with gas, said gas being under substantially greater than atmospheric pressure when said plunger is fully extended, and said plunger is recessed at its inner end to enlarge substantially the chamber formed by said container.

17. A shock programmer comprising a container having walls forming two chambers therein, a plunger slidingly sealed in said container and projecting into one of said chambers, means operable from outside said chamber for simultaneously changing the volumes of said two chambers by the same amount in opposite directions, and means for interconnecting said two chambers when the volume of said one chamber is being changed by said volume-changing means, the walls forming said one chamber being rigidly held against movement when said plunger moves into said one chamber, and the walls forming said one chamber being substantially closed to the passage of liquid during inward movement of said plunger during a shock pulse.

18. A shock programmer as claimed in claim 17 in which said volume-changing means comprises a wall seprating said two chambers and threaded in said container, pins extending parallel to the axis of said plunger and slidingly fitted into said plunger and said wall, and said means for interconnecting said two chambers comprises a restricted passage between said chambers.

19. A shock programmer as claimed in claim 17 in which said two chambers are completely filled with compressible liquid.

20. A shock programmer as claimed in claim 17 in which said volume-changing means comprises a wall separating said two chambers and movable to enlarge one of said chambers while simultaneously reducing the other of said chambers.

21. A shock programmer comprising a container having first and second chambers therein, a plunger slidingly sealed in said first chamber, a partition wall slidingly sealed in said second chamber and dividing the second chamber into first and second sections, said container having a passageway between said first chamber and said first section of said second chamber, and a one-way check valve controlling said passageway and opening to permit flow from said first chamber to said first section.

22. A shock programmer as claimed in claim 21 further comprising a constantly open restricted passageway from said first chamber to said first section.

23. A shock programmer as claimed in claim 21 in which said container has separate passage means for said first chamber and said second section through which fluid can be added and removed, and openable closures for said passage means.

24. A shock programmer as claimed in claim 23 further comprising a constantly open restricted passageway from said first chamber to said first section, said first chamber and first section being filled with liquid, and said second section being filled with gas.

References Cited by the Examiner

UNITED STATES PATENTS

| | | | |
|---|---|---|---|
| 1,445,669 | 2/1923 | Dieterich. | |
| 1,921,624 | 8/1933 | Lewis | 73—12 X |
| 2,656,711 | 10/1953 | Tschudi | 73—12 |
| 2,740,286 | 4/1956 | De Vost et al. | 73—12 |
| 2,751,216 | 6/1956 | Taylor | 267—1 |
| 2,904,328 | 9/1959 | Williams | 267—1 |
| 2,907,201 | 10/1959 | Keener | 73—12 |
| 2,925,262 | 2/1960 | Zumwalt | 267—1 |
| 2,937,865 | 5/1960 | Patterson | 267—1 |
| 2,982,537 | 5/1961 | Rumsey | 267—1 |

OTHER REFERENCES

Publication entitled "Impulsive Method for Programmed Acceleration Control," from Monterey Research Laboratory, Inc., received Dec. 8, 1961, classified 73–12.

RICHARD C. QUEISSER, *Primary Examiner.*

JOSEPH P. STRIZAK, *Examiner.*